US008578371B2

(12) United States Patent
Celli et al.

(10) Patent No.: US 8,578,371 B2
(45) Date of Patent: Nov. 5, 2013

(54) SOFTWARE DISTRIBUTION METHOD AND SYSTEM WITH AUTOMATIC PREREQUISITE INSTALLATION

(75) Inventors: Massimiliano Celli, Latina (IT); Marco Secchi, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 2579 days.

(21) Appl. No.: 11/214,574

(22) Filed: Aug. 30, 2005

(65) Prior Publication Data

US 2006/0048145 A1 Mar. 2, 2006

(30) Foreign Application Priority Data

Aug. 31, 2004 (FR) .................................. 04 300566

(51) Int. Cl.
*G06F 9/44* (2006.01)
(52) U.S. Cl.
USPC ........................................................ 717/177
(58) Field of Classification Search
USPC ............ 717/177, 178, 173; 395/200; 709/218
See application file for complete search history.

(56) References Cited

U.S. PATENT DOCUMENTS

| 5,721,824 | A  | * | 2/1998 | Taylor ........................... 709/203 |
| 5,960,204 | A  | * | 9/1999 | Yinger et al. ................... 717/176 |
| 2002/0100036 | A1 | * | 7/2002 | Moshir et al. .................. 717/173 |
| 2002/0124055 | A1 | * | 9/2002 | Reisman ........................ 709/218 |
| 2002/0133814 | A1 | * | 9/2002 | Bourke-Dunphy et al. .. 717/174 |
| 2004/0015961 | A1 | * | 1/2004 | Chefalas et al. ............... 717/178 |

OTHER PUBLICATIONS

"Debian Package Management, Part 1: A User's Guide" by D. Blackman, Linux Journal vol. 2000, Nov. 2000, 6 pages.*

* cited by examiner

*Primary Examiner* — Sam Sough
*Assistant Examiner* — Carina Yun
(74) *Attorney, Agent, or Firm* — Garg Law Firm, PLLC; Rakesh Garg; Libby Z. Toub (57) ABSTRACT

A software distribution method (300) is proposed. The solution of the invention relates to the deployment (from a source host to selected endpoints) of main packages that require one or more prerequisite packages. In this case, the source host builds (304-326) and transmits (330-332) a multi-segment distribution structure that embeds the main package and any prerequisite package that is not available on at least one of the endpoints. Each endpoint receiving the distribution structure only installs (336-360) the prerequisite packages that are not available on the endpoint. The main package can then be installed (362-366) correctly (with the required configuration of the endpoint).

17 Claims, 7 Drawing Sheets

SOFTWARE DISTRIBUTION METHOD AND SYSTEM WITH AUTOMATIC PREREQUISITE INSTALLATION

TECHNICAL FIELD

The present invention relates to the data processing field. More specifically, the present invention relates to a method of distributing software products. The invention further relates to a computer program for performing the method, and to a product embodying the program. Moreover, the invention also relates to a corresponding data processing system.

BACKGROUND ART

Distribution of software products is a time consuming activity, particularly in a system including a great number of target computers (or endpoints) on which the software products must be installed. A typical example is that of a large network with hundreds of workstations, wherein software products are periodically upgraded in order to be abreast of the information technology development.

Software distribution applications have been proposed in the last years to assist a system administrator in efficiently managing deployment of software products from a central site of the system. An example of software distribution application is the "Tivoli Configuration Manager" by IBM Corporation. Typically, a software distribution application controls the building of software packages including instructions specifying the actions to be carried out on the endpoints for installing or removing corresponding software products; each software package can further embed an image of the software products to be installed on the endpoints. The software package is transmitted to each endpoint, and it is then applied by executing the corresponding instructions.

Some software distribution applications also allow verifying whether each software package can actually be applied on the endpoints (before its distribution). For this purpose, the software package specifies one or more conditions that must be satisfied by the endpoints; for example, the installation of the corresponding software product requires a specific hardware configuration, the availability of other software products (prerequisites), or the absence of incompatible software products (ex-requisites). The verification is performed by exploiting a central database, which stores the (alleged) configuration of the endpoints resulting from the application of the software packages previously deployed.

In this case, an exception is raised whenever some conditions are not satisfied on one or more endpoints. As a consequence, the distribution of the software package on those endpoints is skipped and the administrator is notified accordingly.

Particularly, if prerequisite products are not available on the endpoints the administrator is required to install such products manually (before trying to distribute the skipped software package again).

However, this operation is very time-consuming; moreover, it must be repeated individually on each endpoint wherein the prerequisite products are not available.

The manual installation of the prerequisite products is also prone to errors (due to the fact that different prerequisite products must generally be installed on each endpoint).

In addition, it is not possible to exclude that the configurations of the endpoints have changed out of the control of the distribution application (so that the information stored in the central database is not up-to-date). In this case, errors can still arise during the actual application of the software package on the endpoints (for example, because some prerequisite products have been removed manually).

The above-mentioned drawbacks are particular acute in large systems, wherein the prerequisite products can be non-available on a high number of endpoints.

SUMMARY OF THE INVENTION

The present invention proposes a solution for automatically installing the prerequisite products.

Particularly, an aspect of the present invention provides a method of distributing software products from a source computer to a plurality of target computers. The method starts with the step of providing a main package for installing a main product (which requires a set of prerequisite products), and a set of prerequisite packages, each one for installing a corresponding prerequisite product. The method continues selecting at least one of the prerequisite packages. A distribution structure (for the main package and the at least one prerequisite package) is then built. The distribution structure can now be transmitted from the source computer to the target computers. For each target computer, the method continues verifying the availability of the at least one prerequisite product on the target computer. Each non-available prerequisite product is then installed on the target computer by using the corresponding prerequisite package; the main product can now be installed on the target computer by using the main package.

The solution of the invention automatically resolves the exceptions caused by the lack of any prerequisite products on the target computers.

This avoids (or at least strongly reduces) the need of manual interventions by the administrator.

As a result, the performance and the reliability of the distribution process are dramatically increased.

At the same time, the verification performed on each target computer avoids any inconsistency in their configuration (even when some actions have been performed out of the control of the distribution application).

The above-mentioned advantages are clearly perceived in large systems with a high number of target computers (even if different applications of the invention are contemplated).

It should be noted that those results are achieved with a distribution structure that is common for all the target computers, irrespective of their actual configuration (without the need of building a specific software package for each target computer).

The preferred embodiments of the invention described in the following provide additional advantages.

For example, the selection of the at least one prerequisite package involves determining the potentially non-available prerequisite products (which are not available on one or more of the target computers); the prerequisite package corresponding to each potentially non-available prerequisite product is then selected.

The proposed feature prevents the distribution of prerequisite packages that are not necessary.

A way to further improve the solution is to determine the number of target computers on which at least one prerequisite product is not available; the distribution structure is then built and transmitted only if said number of target computers reaches a threshold value.

The devised solution avoids distributing information to all the target computers unnecessary (when the information is only required by a small number of target computers).

Advantageously, each target computer returns feedback information (indicative of the result of the installation of each package) to the source computer; the source computer updates configuration information of the target computers according to the feedback information. In this case, the determination of the potentially non-available prerequisite products and the determination of said number of target computers are based on the configuration information.

Therefore, the selection of the prerequisite packages to be inserted into the distribution structure can be performed locally by the source computer.

In a preferred implementation of the invention, the distribution structure is transmitted to each target computer by sending it to an associated depot computer; the prerequisite package for each non-available prerequisite product and the main package are then downloaded from the depot computer to the target computer.

In this way, the target computer only receives the prerequisite packages that are actually required.

Advantageously, the main package includes service information indicative of an order of installation of the prerequisite products (which service information is sent by the depot computer to the target computer). The target computer requests the prerequisite package (for each non-available prerequisite product following a first non-available prerequisite product) to the depot computer in response to the successful installation of a previous non-available prerequisite product; the target computer then requests the main package to the depot computer in response to the successful installation of all the non-available prerequisite products.

Therefore, the process is automatically aborted whenever an error is encountered (thereby avoiding downloading software packages unnecessarily).

As an additional enhancement, the distribution structure includes an indication of one or more ex-requisite products that are incompatible with the main product. In this case, each target computer further verifies the availability of the ex-requisite products thereon; each available ex-requisite product is then removed from the target computer.

This feature automatically resolves any product incompatibility on the target computers.

A further aspect of the present invention provides a computer program for performing the above-described method.

A still further aspect of the invention provides a program product embodying this computer program.

Moreover, another aspect of the invention provides a corresponding data processing system.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
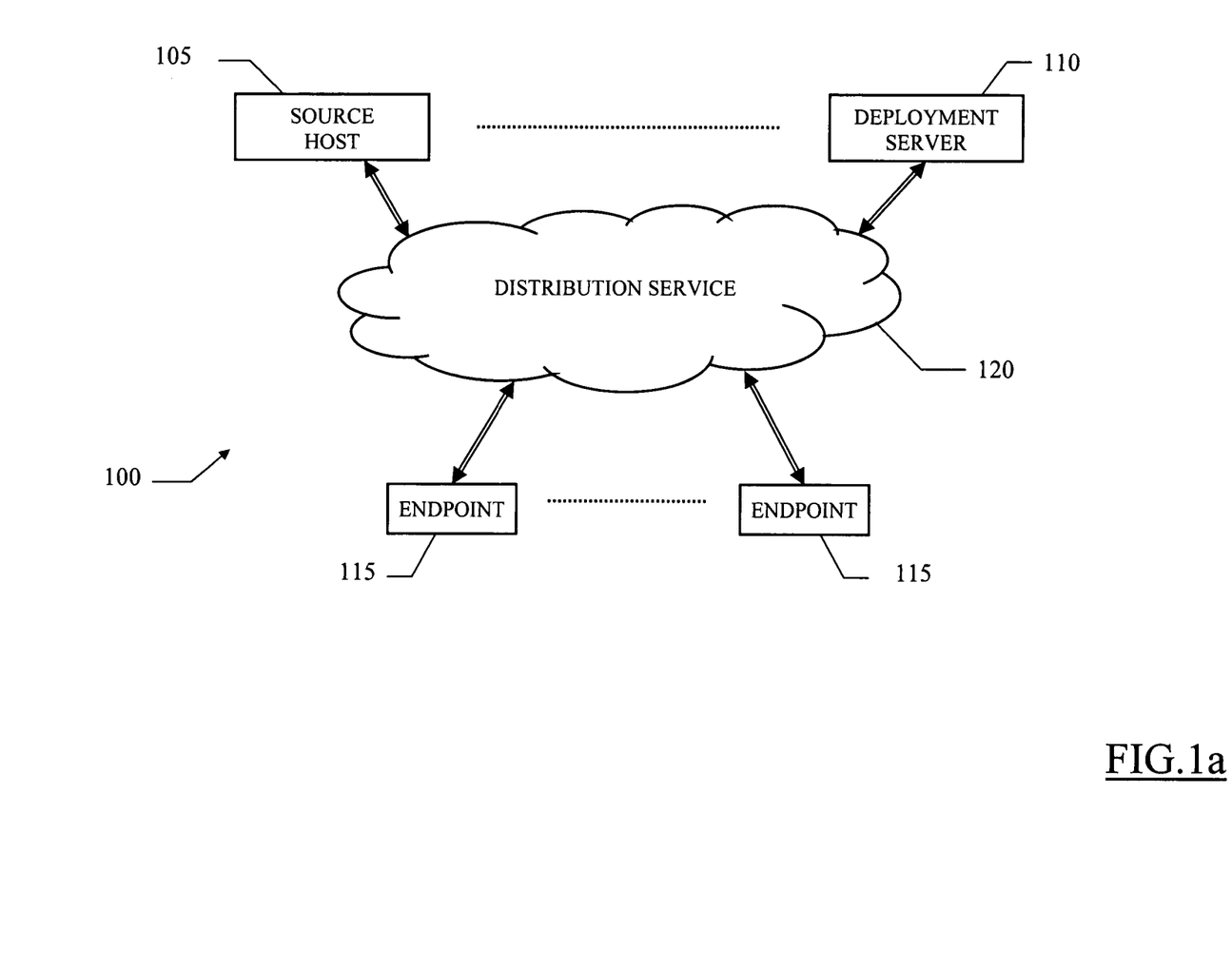
FIG. 1a is a schematic block diagram of a data processing system in which the method of the invention is applicable.

With reference in particular to FIG. 1a, a data processing system 100 with distributed architecture is illustrated. A source host 105 operates as a preparation and testing central site for software products to be distributed throughout the system 100. The source host 105 interfaces with a deployment server 110, which controls the distribution of the software products to multiple endpoints 115. For this purpose, the source host 105, the deployment server 110 and the endpoints 115 exploit a distribution service 120; the distribution service 120 is implemented by one or more levels of gateways (around which the endpoints 115 are clustered).

Similar considerations apply if the system has a different architecture or includes equivalent elements (for example, with the source host and the deployment server that are combined into a single computer).

Figure 1B:
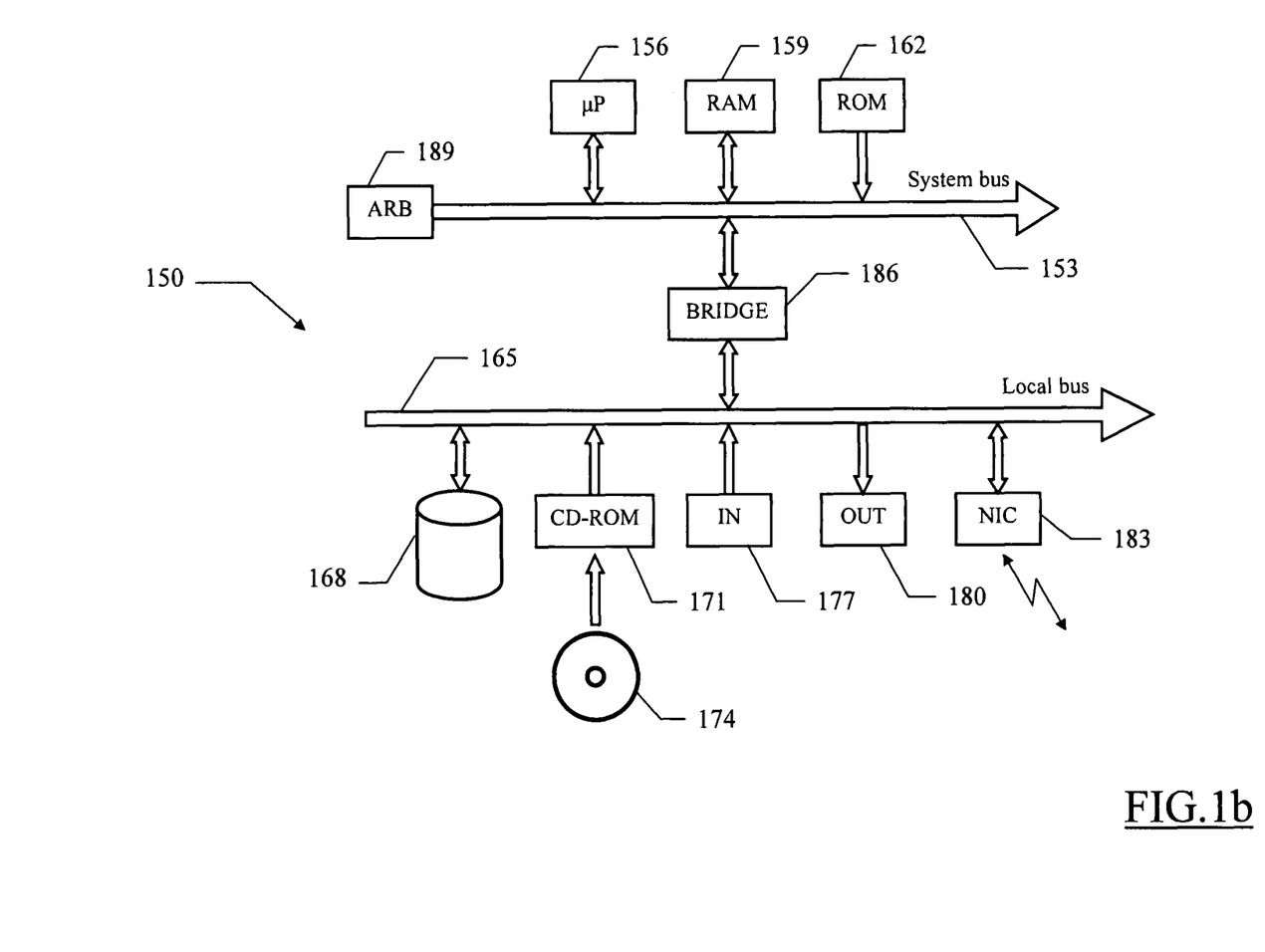
FIG. 1b shows the functional blocks of a generic computer of the system.

As shown in FIG. 1b, a generic computer of the system (source host, deployment server, endpoint or gateway) is denoted with 150. The computer 150 is formed by several units that are connected in parallel to a system bus 153. In detail, one or more microprocessors (µP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to a network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the computer has a different structure or includes equivalent units.

Figure 2:
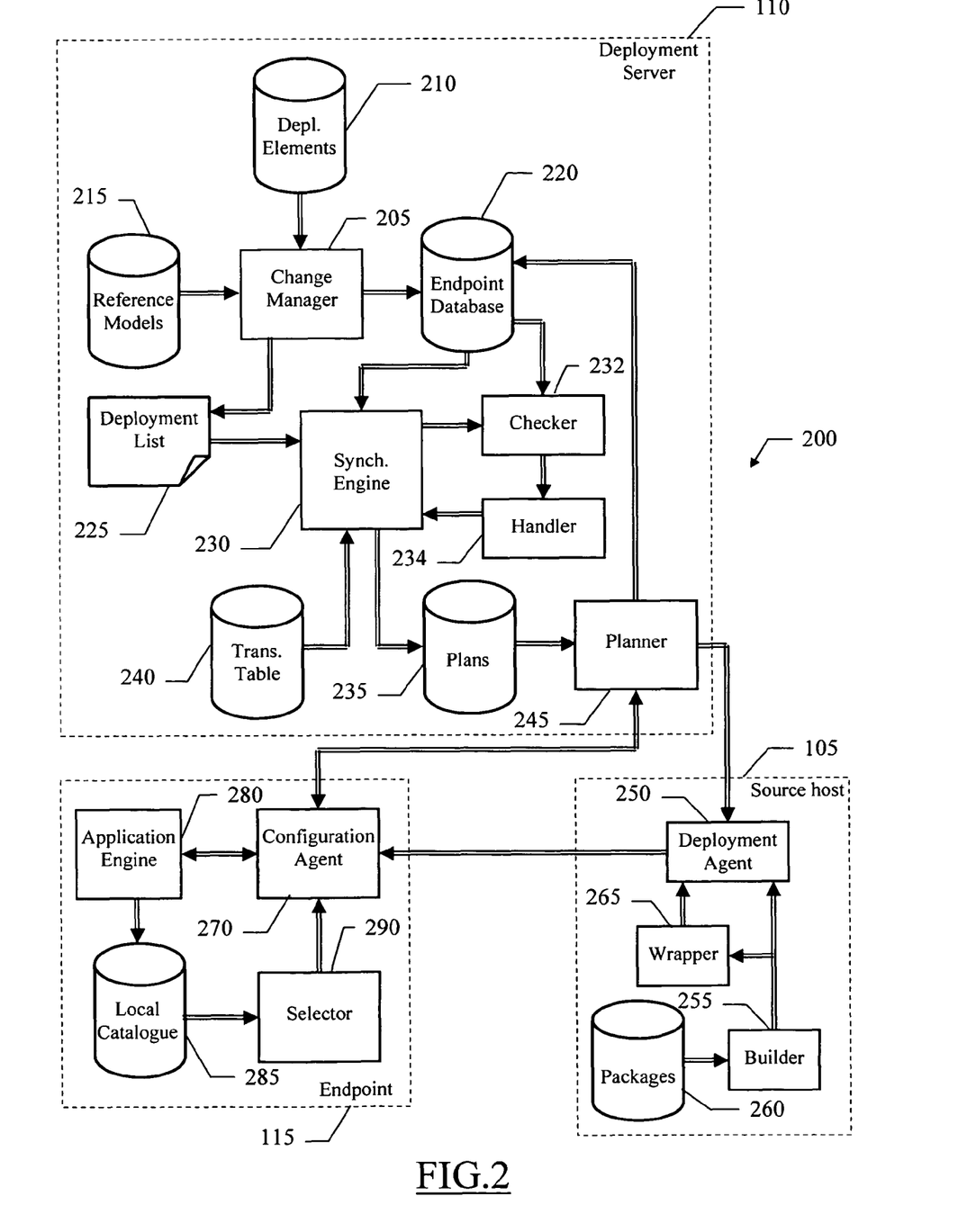
FIG. 2 depicts the main software components that can be used for practicing the method.

Considering now FIG. 2, the main software components that can be used for practising the invention are denoted as a whole with the reference 200. The information (programs and data) is typically stored on the hard-disks and loaded (at least partially) into the corresponding working memories when the programs are running. The programs are initially installed onto the hard-disks from CD-ROMs.

With reference in particular to the deployment server 110, a change manager 205 controls a repository 210 of deployment elements. Each deployment element defines an entity to be used during a software distribution process; typically, the deployment element references a software package that is provided by the source host 105.

A preferred structure of the software package is described in WO-A-003085513 (the entire disclosure of which is herein incorporated by reference). Briefly, the software package is logically organized into a hierarchical structure starting from a root node. Each leaf node of the hierarchical structure corresponds to an action to be performed on the endpoints during the distribution process; some actions are self-contained (for example, to reboot the endpoint), whereas other actions take a subject referred to as an installable object (for example, consisting of a software resource to be added, replaced or removed). Each node of the hierarchical structure causes a class to be instantiated. The class exposes a series of attributes, which enable the execution of the corresponding action when evaluated to true. For example, the action is conditioned to different hardware parameters of the endpoint (such as the microprocessor model or the RAM size), to the operating system installed thereon, and the like. The class further exposes a method for verifying whether the action can be performed or reversed on the endpoint, and a method for causing its actual execution. The class for an action with an installable object also has an associated class for this object.

The software package is defined by an instruction section (also called software package file). Particularly, the instruction section specifies the actions to be carried out on the endpoints (for installing or removing the corresponding software product). The instruction section is generated by serializing the hierarchical structure of the software package into a binary representation. For this purpose, the hierarchical structure is traversed top-down and a coding method is called on each class for adding a corresponding record to the instruction section. Alternatively, the software package is described with a plain text file, which is based on a sequence of stanzas (each one representing an action); in this case, the instruction section is generated interpreting the text file with conventional parsing techniques.

In addition, the instruction section is also used to specify service information (such as the name and version of the software package, its creation and last modification time, different operative options, and the like). In a preferred embodiment of the invention, the instruction section further allows defining any dependencies of the software package (hereinafter called main package); this information indicates the conditions that must be satisfied for the correct installation of the corresponding software product. Particularly, the dependencies can consist of one or more prerequisite software packages (denoting that the corresponding software products are required by the main product) or ex-requisite software packages (denoting that the corresponding software products are incompatible with the main product); these conditions can also be combined with standard logical operators (such as AND, OR, and NOT).

The software package to be actually distributed to the endpoints is built from its instruction section. For this purpose, the name assigned to each record is used to access a lookup table specifying the corresponding class; once the class has been instantiated, a decoding method is called on the class for generating the corresponding hierarchical structure. The hierarchical structure is then traversed, and a building method is called on each class; if the class has an associated installable object, this method retrieves and adds an image of the required resource to the software package.

The change manager 205 further controls a repository 215 of reference models. Each reference model specifies a desired state of one or more selected software packages on the endpoints subscribing to the reference model; for example, the desired state indicates that the corresponding software product must be installed in an undoable manner, committed, or removed. The subscribers are identified by a role, which specifies a functional group of endpoints; for example, the role is defined by the computers assigned to a category of users (such as developers, secretaries, managers), belonging to a selected department, or having specific features. The endpoints of a generic role can be characterized either statically (for example, by means of a list) or dynamically (for example, by means of a query).

A database 220 stores configuration information of the endpoints of the system. Particularly, the endpoint database 220 specifies an actual state of the software packages that have been distributed to each endpoint (i.e., whether the software package has been correctly applied so as to reach its desired state).

The software distribution process involves the dynamic generation of a deployment list 225 by the change manager 205; for each endpoint belonging to the role indicated in a selected reference model, the deployment list 225 specifies the desired states of the software packages specified in that reference model.

The deployment list 225 is supplied to a synchronization engine 230, which also accesses the endpoint database 220. The synchronization engine 230 determines the activities to be performed on each endpoint (associated with the selected reference model) for reaching the desired state of each relevant software package. For this purpose, the synchronization engine 230 exploits a transition table 240, which indicates the activities required to reach each desired state from each current state (for example, install a software package that is not available or remove a software package that has been previously installed).

The synchronization engine 230 also interfaces with a dependency checker 232, which is used to verify whether the required activities can be executed on the endpoints; particularly, for each main package to be installed on a specific endpoint, the checker 232 verifies whether the corresponding prerequisite products are available (as indicated in the endpoint database 220). Whenever an exception is raised (because one or more prerequisite products have not been installed yet), the checker 232 invokes a dependency handler 234.

The handler 234 determines the number of non-compliant endpoints, on which the main package must be applied but one or more prerequisite products are not available. If this number reaches a threshold value (for example, between 3%-15% and preferably between 5%-10%, such as 7%), the handler 234 replaces the main package with a corresponding nested package in the activities to be executed on all the relevant endpoints. The nested package consists of a multi-segment distribution structure, wherein each segment includes a corresponding software package. Particularly, the distribution structure embeds the prerequisite packages that are not available on at least one endpoint (in the desired order of installation) and the main package (in the last segment); in this way, the distribution structure will include all the prerequisite packages that are potentially not available on the endpoints. The packages embedded in the multi-segment distribution structure are listed in a corresponding Table of Content (TOC).

A resulting plan 235 is submitted by the synchronization engine 230 to a planner 245, which controls execution of the desired activities on the endpoints. For this purpose, the planner 245 instructs the source host 105 to build the required software packages and to distribute them to the relevant endpoints. Moreover, the planner 245 updates the information relating to each endpoint in the database 220, according to the result of the application of the software packages.

Particularly, the planner 245 interfaces with a deployment agent 250 running on the source host 105. The deployment agent 250 controls a builder 255; this module builds the required software packages from their definitions stored in a corresponding repository 260. The deployment agent 250 also controls a wrapper 265, which is used to build the nested packages. For this purpose, the wrapper 265 receives the (main and prerequisite) packages to be embedded into the corresponding multi-segment distribution structure from the builder 255.

The planner 245 also communicates with a configuration agent 270 running on each endpoint 115. The configuration agent 270 downloads the required software packages from the deployment agent 250 of the source host 105 (through the associated gateways, not shown in the figure). The configuration agent 270 interfaces with an engine 280, which enforces the application of those software packages on the endpoint 115. The application engine 280 logs an indication of the actions that have been executed on the endpoint 115 into a local catalogue 285 (with the same information that is also returned as a feedback to the planner 245 through the configuration agent 270). Preferably, the local catalogue 285 also points to back-up copies of any resources that have been updated or removed as a result of the execution of the above-mentioned actions.

The configuration agent 270 further interfaces with a selector 290 for the application of the nested packages. For each main package to be installed, the selector 290 determines the prerequisite products that are not available on the endpoint 115 (as indicated in the local catalogue 285); the selector 290 then instructs the configuration agent 270 to download the required segments (i.e., the ones including the prerequisite packages actually to be installed on the endpoint 115 and the main package).

Similar considerations apply if the programs and the corresponding data are structured in another way, or if different modules or functions are provided. More generally, the present invention is suitable to be implemented in any other distribution application (for example, without the concept of reference model). In addition, the dependencies can be defined in a different way, or another threshold value can be used (for example, being set dynamically).

Considering now FIGS. 3a-3d, the logic flow of a distribution process according to an embodiment of the invention is represented with a method 300. The method begins at the black start circle 302 in the swim-lane of the source host. Passing to block 304, the software packages to be deployed are defined (by specifying the corresponding instruction sections and providing any associated resource images); at the same time, the prerequisite packages required by the main packages are likewise defined.

Figure 3A:
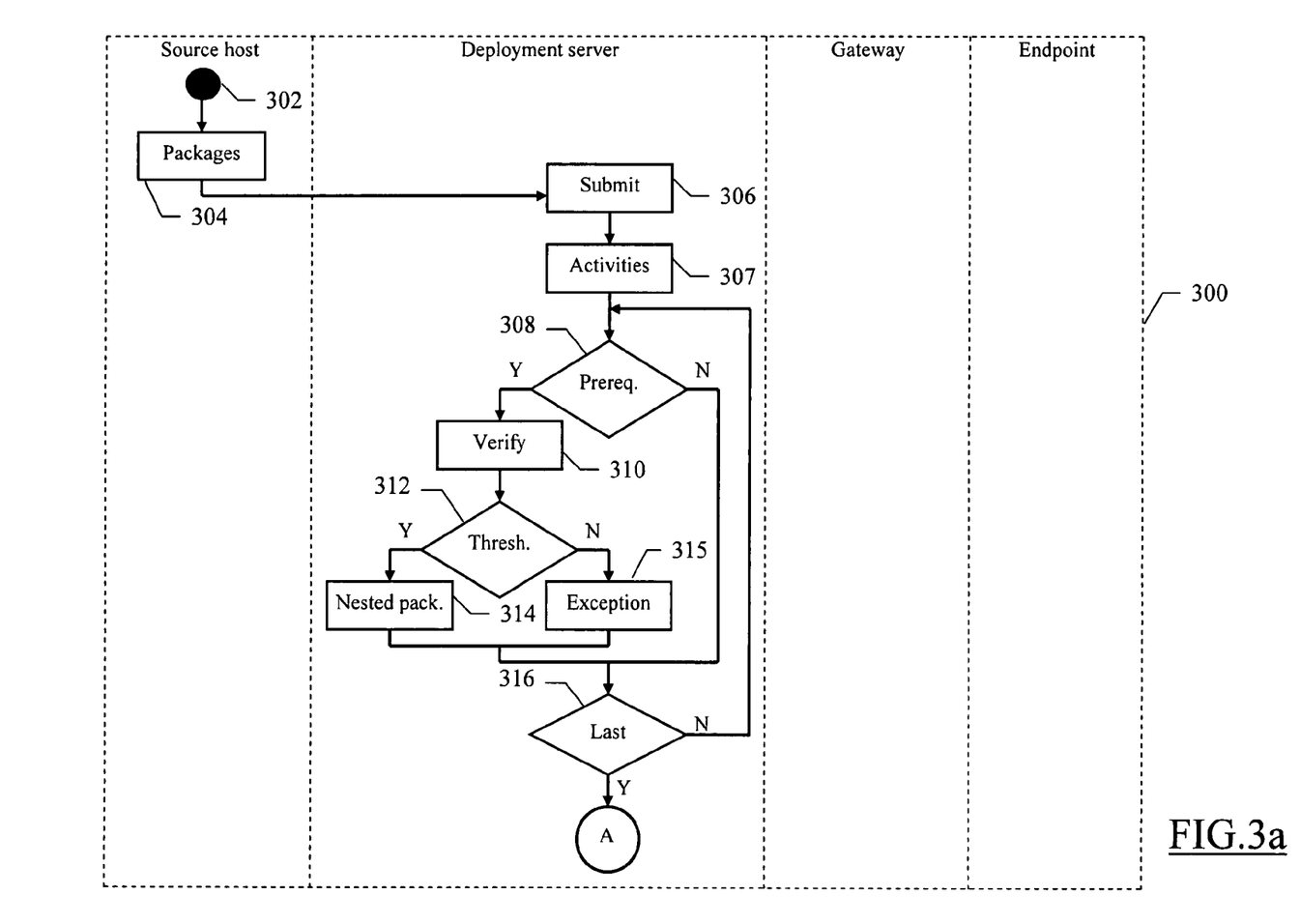
FIGS. 3a-3d show a diagram describing the flow of activities relating to an illustrative implementation of the method.

The method then moves to block 306 in the swim-lane of the deployment server, wherein a system administrator submits a software distribution request for a selected reference model. In response thereto, the synchronization engine at block 307 determines the activities to be performed on each endpoint subscribing to the reference model. A loop is then performed for each software package to be distributed (starting from the first one); the loop begins at block 308, wherein a test is made to determine whether the application of the software package requires any prerequisite packages. If so, the method verifies at block 310 the availability of the corresponding prerequisite products on each endpoint to which the main package must be distributed (as indicated in the endpoint database). A test is now made at block 312 to determine whether the number of non-complaint endpoints (on which at least one prerequisite product is not available) reaches the desired threshold value. If so, the method passes to block 314 wherein the main package is replaced with a corresponding nested package in all the relevant activities (with the nested package that embeds the main package and its prerequisite packages that are not available on at least one endpoint). Conversely, an exception is raised at block 315 (requiring the administrator to install the required prerequisite packages on the non-compliant endpoints manually). In both cases, the flow of activity then descends into block 316; the same point is also reached directly from block 308, when the application of the software package does not require any prerequisite package. A test is now made to determine whether the last software package has been processed. If not, the method returns to block 308 for repeating the same operations on a next software package.

Figure 3B:
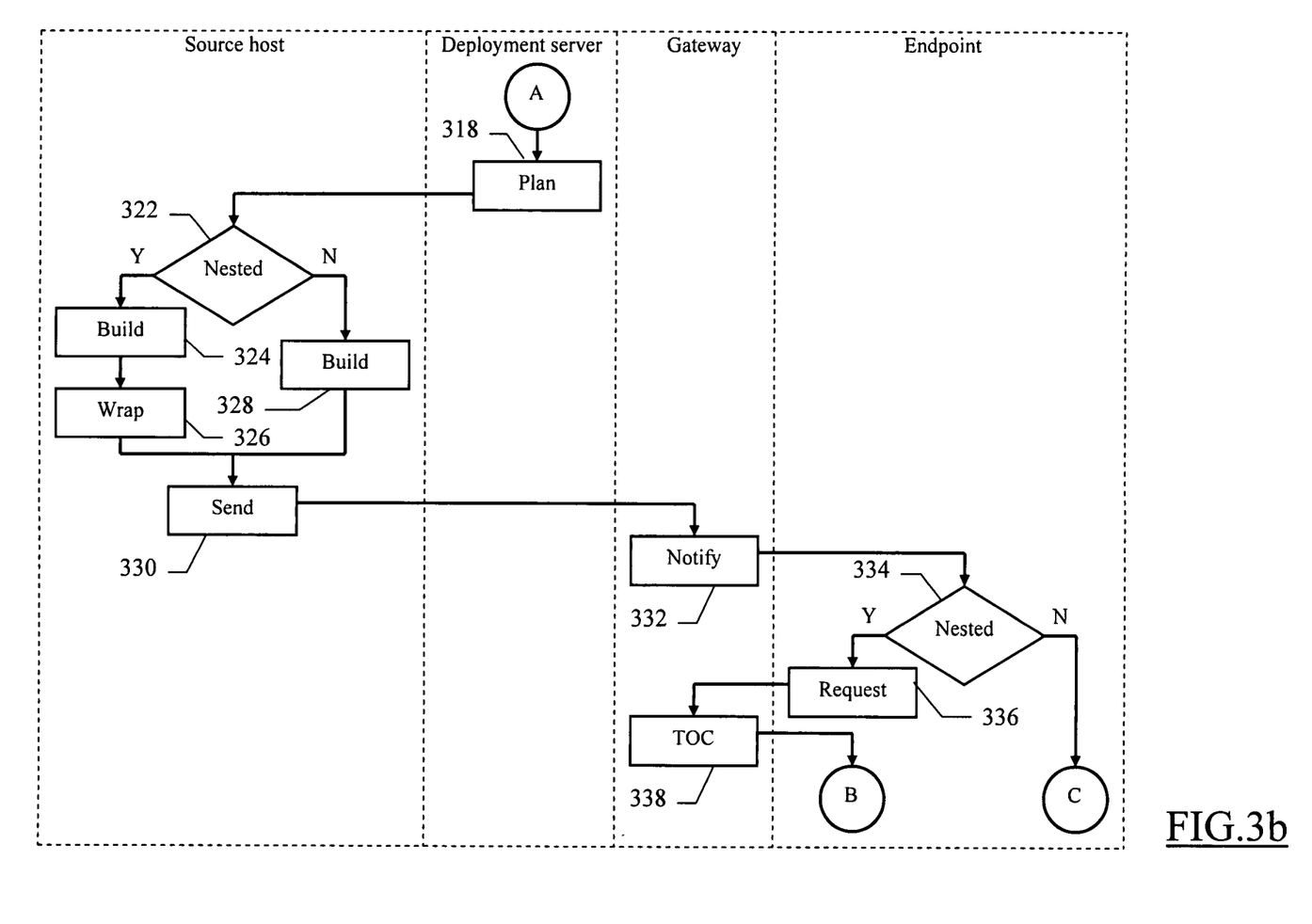

Once all the software packages have been verified, the method descends into block 318 wherein the resulting plan is submitted for execution. For each activity to be performed on the endpoints, a corresponding request is transmitted to the source host; in response thereto, the flow of activity branches at decision block 322 according to the type of involved software package. Particularly, when the activity relates to a nested package the source host at block 324 retrieves or builds all the required software packages (i.e., the main package and the prerequisite packages that are potentially not available on the endpoints); continuing to block 326, those software packages are then wrapped into the corresponding multi-segment distribution structure. Conversely, the source host simply retrieves or builds the required (standard) software package at block 328.

The flow of activity merges at block 330, wherein the (nested or standard) software package is transmitted to the endpoint; at the same time, an identification code is returned to the deployment server (enabling the administrator to monitor and control the distribution process). The process takes place across the hierarchy of gateways, which operate as repeaters (or depots) wherein the software package is loaded and stored. Once the software package has reached a last gateway around which the endpoint is clustered, this gateway at block 332 accordingly notifies the endpoint (by means of a label identifying the software package and its type).

Moving to the swim-lane of the endpoint, the flow of activity branches at block 334 according to the type of software package to be applied. Particularly, if the distribution process relates to a nested package the blocks 336-366 are executed, whereas if the distribution process relates to a standard package the blocks 368-370 are executed; in both cases, the method then passes to block 372 (described in the following).

Figure 3C:
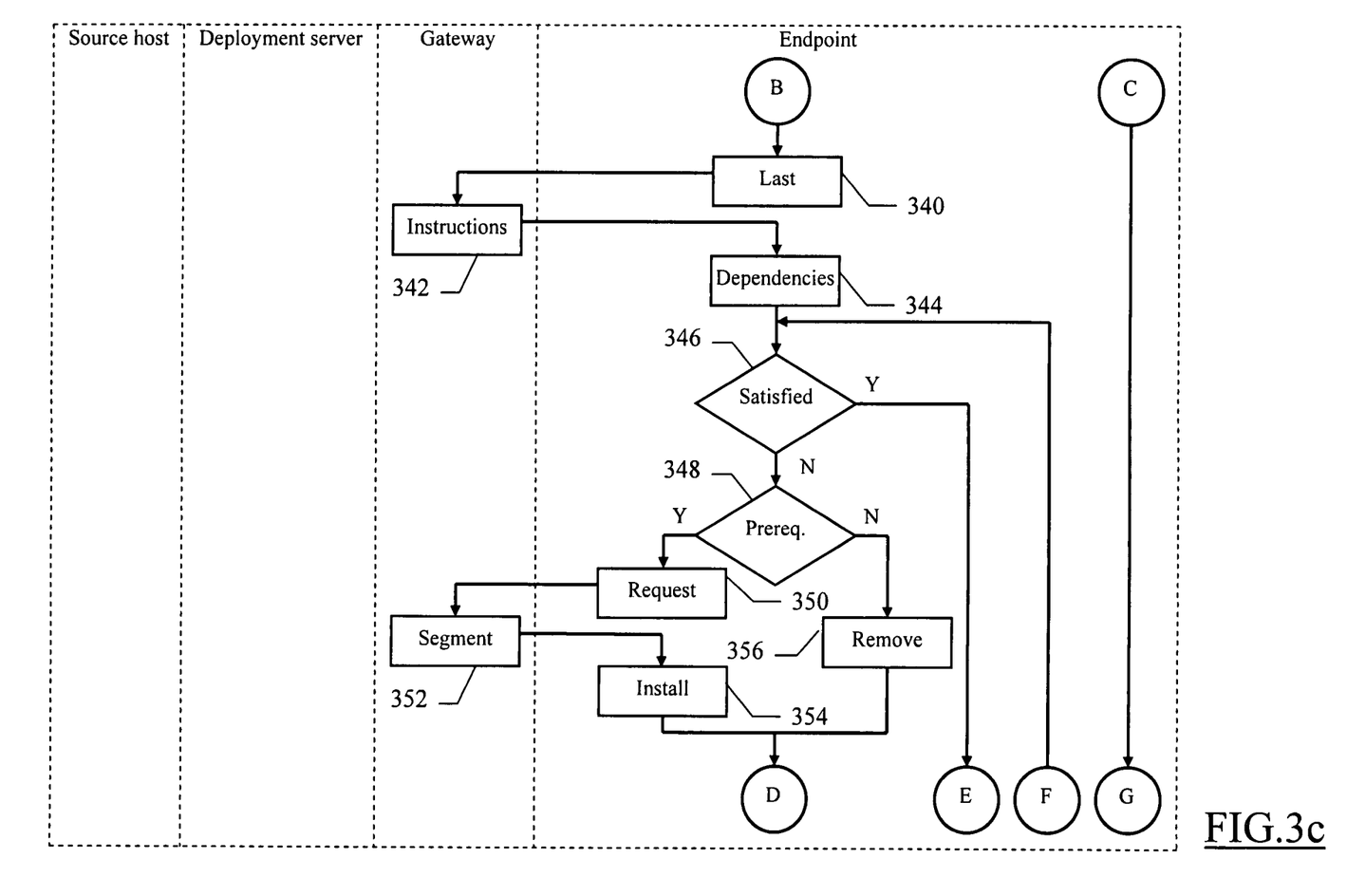

With reference now to block 336 (nested package), the endpoint opens a communication channel to the associated gateway and requests the TOC of the corresponding multi-segment distribution structure. Proceeding to block 338, the required information is downloaded from the gateway to the endpoint. In response thereto, the endpoint at block 340 requests the instruction section of the main package (i.e., the last segment of the distribution structure) to the gateway. Likewise, the required information is downloaded from the gateway to the endpoint at block 342.

Returning to the swim-lane of the endpoint, the dependencies of the main package are extracted at block 344 from its instruction section. A loop is then performed for each corresponding condition (starting from the first one); the loop begins at block 346, wherein the method verifies whether the condition is satisfied on the endpoint. If not, the method branches at decision block 348 according to the type of condition.

Particularly, when the condition specifies the installation of a prerequisite product a request for the corresponding software package (identified in the TOC of the multi-segment distribution structure) is sent to the gateway at block 350. Proceeding to block 352, the required segment is downloaded from the gateway to the endpoint. In response thereto, the endpoint at block 354 applies the prerequisite package so as to install the corresponding product. More in detail, the instruction section of this software package is the first file received by the endpoint; the instruction section is simultaneously read and decoded, in order to create the hierarchical structure of the software package in the working memory of the endpoint. The application engine then traverses the hierarchical structure so obtained top-down (by calling a desired method on the class at the top of the hierarchy, which method in turn calls the same method on its children). For each action, the application engine at first verifies whether the endpoint meets any associated conditions. The action is then executed on the endpoint (if possible), after performing a back-up copy of any resources that could be updated or removed by its execution. Information about the result of the application of the software package on the endpoint is logged into the local catalogue.

Referring back to block 348, when the condition specifies the removal of an ex-requisite product the required actions are executed on the endpoint; this operation is performed by invoking the corresponding software package (which instruction section has been typically logged on the endpoint during its previous installation).

In both cases, the method merges at block 358; a test is now made to determine whether the above-described operations have been successful (i.e., the prerequisite product has been installed or the ex-requisite product has been removed). If so, the method passes to decision block 360; the same point is also reached directly from block 346 when the condition is already satisfied on the endpoint. If the last condition (specified in the instruction section of the main package) has not been processed yet, the flow of activity returns to block 346 for repeating the same operations on a next condition.

Figure 3D:
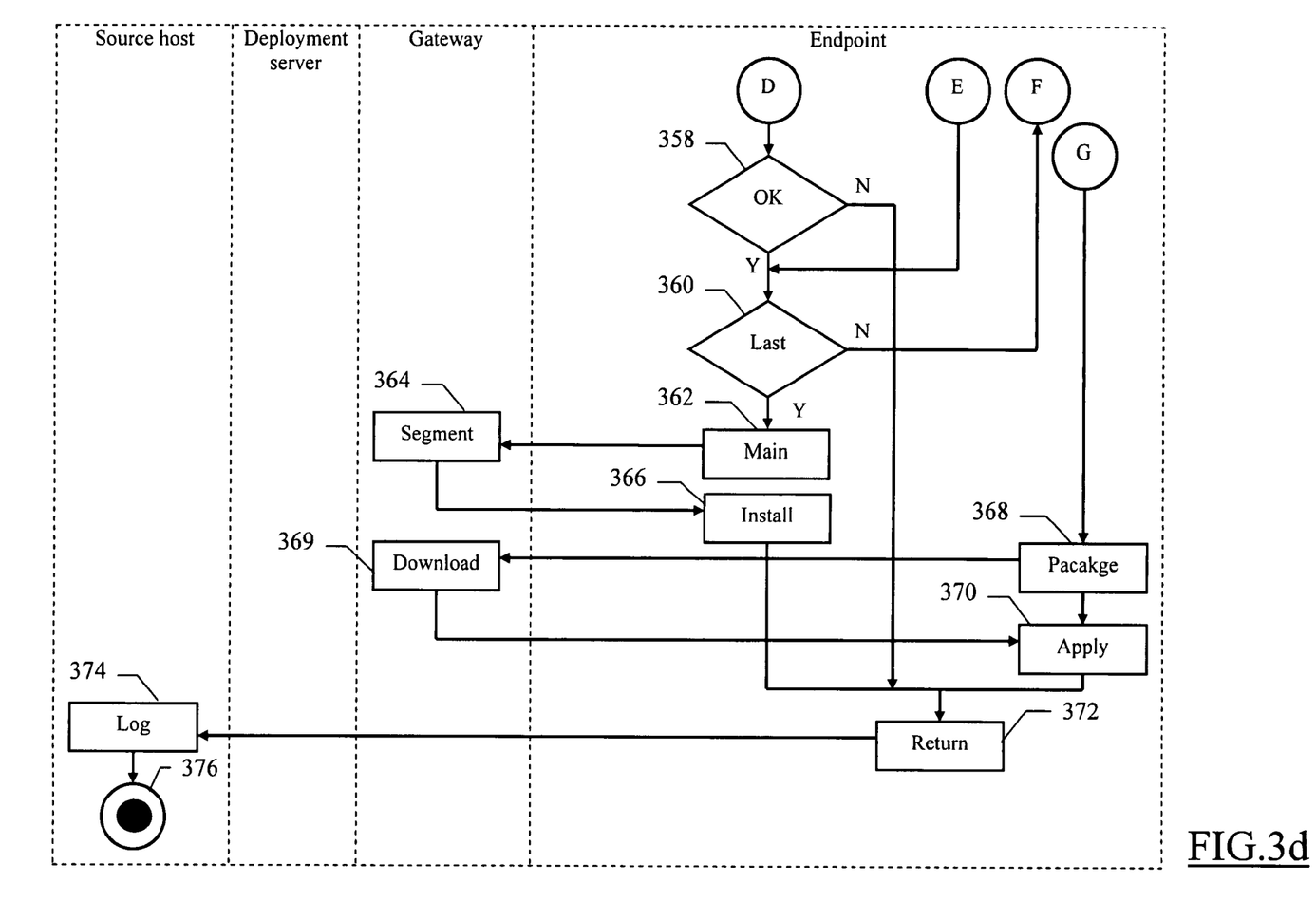

As soon as all the dependencies have been verified, the method descends into block 362; a request for the main package (embedded in the last segment identified in the TOC of the distribution structure) is now sent to the gateway. Proceeding to block 364, the required segment is downloaded from the gateway to the endpoint. In response thereto, the endpoint at block 366 applies the main package so as to install the corresponding product. The method then continues to block 372; the same point is also reached directly from block 358 when the installation of a prerequisite product or the removal of an ex-requisite product has failed.

With reference now to block 368 (standard package), a corresponding request is sent by the endpoint to the gateway. As a consequence, the software package is downloaded from the gateway to the endpoint at block 369. The software package is then applied on the endpoint at block 370 (repeating the same operations described above).

The flow of activity merges at block 372, wherein feedback information (relating to the result of the application of the software package) is returned to the deployment server. In response thereto, the planner at block 374 accordingly updates the entry for the endpoint in the corresponding database. The method then ends at the concentric black/white stop circles 374.

Similar considerations apply if the method includes equivalent or additional steps.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

For example, similar considerations apply if the software products are distributed from any source computer (consisting of one ore more data processing entities) to generic target computers (such as PDAs, mobile phones, and the like). In addition, the reference to the nested package must not be interpreted in a limitative manner; more generally, the invention can be implemented using any other distribution structure (even including a link to the actual software packages only in each segment).

In any case, it is possible to exploit different techniques for verifying the availability of the prerequisite products and/or the ex-requisite products on each endpoint (for example, by a run-time scanning of its memory).

The solution of the invention is also suitable to be practiced with each endpoint that returns an updated TOC to the associated gateway, so as to cause the downloading of the required prerequisite packages only.

The programs can also be distributed on any other computer readable medium (such as a DVD).

Moreover, it will be apparent to those skilled in the art that the additional features providing further advantages are not essential for carrying out the invention, and may be omitted or replaced with different features.

For example, it is possible to insert all the pre-requisite packages into the nested package. This implementation ensures that the required pre-requisite packages are always available for each endpoint, irrespective of the configuration information stored in the endpoint database (even if it can involve an overloading of the distribution service).

Alternatively, the nested package is always built and distributed (when at least one endpoint needs the prerequisite products).

Moreover, the use of a different technique for determining the prerequisite products that are potentially not available on the endpoints is not excluded (for example, by querying the endpoints dynamically).

In any case, the transmission of the whole nested package to each endpoint (even without the use of any gateway) is encompassed.

In a different implementation of the invention, the relevant packages are always applied on each endpoint (without checking the result of the application of the previous ones).

Moreover, an embodiment supporting the automatic installation of the prerequisite products only (and not the removal of the ex-requisite products) is contemplated.

Alternatively, the programs are pre-loaded onto the corresponding hard-disks, are sent to the computers through a network, are broadcast, or more generally are provided in any other form directly loadable into the working memories of the computers. However, the method according to the present invention leads itself to be carried out with a hardware structure (for example, integrated in chips of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims

The invention claimed is:

1. A method of distributing software products from a source computer to a plurality of target computers, the method including the steps of:
   providing a main package for installing a main product, the main product requiring a set of prerequisite products, and a set of prerequisite packages each one for installing a corresponding prerequisite product;
   selecting at least one of the prerequisite packages, the selecting including determining a set of potentially non-available prerequisite products, a potentially non-available prerequisite product being a prerequisite product not available on at least one of the target computers, and selecting a prerequisite package from the set of prerequisite packages corresponding to each potentially non-available prerequisite product in the set of potentially non-available prerequisite products;
   building a distribution structure for the main package and the at least one prerequisite package;
   determining the number of target computers on which at least one prerequisite product is not available, the distribution structure being built and transmitted only if said number of target computers reaches a threshold value;

transmitting the distribution structure from the source computer to the target computers, and for each target computer in the plurality of target computers:

verifying the availability of the at least one prerequisite product on the target computer;

installing each non-available prerequisite product on the target computer by using a prerequisite package from the set of prerequisite packages, the prerequisite package corresponding to the non-available prerequisite product; and installing the main product on the target computer by using the main package.

2. The method according to claim 1, further including the steps of:

each target computer returning feedback information indicative of the result of the installation of each package to the source computer; and the source computer updating configuration information of the target computers according to the feedback information, the determination of the potentially non-available prerequisite products and the determination of said number of target computers being based on the configuration information.

3. The method according to claim 1, wherein the step of transmitting the distribution structure to the target computers includes, for each target computer:

sending the distribution structure to a depot computer associated with the target computer; and downloading the prerequisite package for each non-available prerequisite product and the main package from the depot computer to the target computer.

4. The method according to claim 3, wherein the main package includes service information indicative of an order of installation of the prerequisite products, the step of downloading including:

the depot computer sending the service information to the target computer;

the target computer requesting the prerequisite package, for each non-available prerequisite product following a first non-available prerequisite product, to the depot computer in response to the successful installation of a previous non-available prerequisite product; and the target computer requesting the main package to the depot computer in response to the successful installation of all the non-available prerequisite products.

5. The method according to claim 1, wherein the distribution structure further includes an indication of at least one ex-requisite product being incompatible with the main product, for each target computer the method further including the steps of:

verifying the availability of the at least one ex-requisite product on the target computer; and removing each available ex-requisite product from the target computer.

6. The method according to claim 1, wherein the set of potentially non-available prerequisite products includes a prerequisite product such that the prerequisite product is available on one target computer but absent on another target computer, and wherein the distribution structure includes the prerequisite product.

7. The method according to claim 1, wherein the distribution structure is common for all target computers in the plurality of target computers regardless of a configuration of a target computer in the plurality of target computers.

8. A computer program product comprising a non-transitory computer readable medium including program code directly loadable into a working memory of a data processing system for distributing software products from a source computer to a plurality of target computers, the program code comprising:

computer usable code for providing a main package for installing a main product, the main product requiring a set of prerequisite products, and a set of prerequisite packages each one for installing a corresponding prerequisite product;

computer usable code for selecting at least one of the prerequisite packages, the computer usable code for selecting including computer usable code for determining a set of potentially non-available prerequisite products, a potentially non-available prerequisite product being a prerequisite product not available on at least one of the target computers, and computer usable code for selecting a prerequisite package from the set of prerequisite packages corresponding to each potentially non-available prerequisite product in the set of potentially non-available prerequisite products;

computer usable code for building a distribution structure for the main package and the at least one prerequisite package;

computer usable code for determining the number of target computers on which at least one prerequisite product is not available, the distribution structure being built and transmitted only if said number of target computers reaches a threshold value;

computer usable code for transmitting the distribution structure from the source computer to the target computers, and for each target computer in the plurality of target computers:

computer usable code for verifying the availability of the at least one prerequisite product on the target computer;

computer usable code for installing each non-available prerequisite product on the target computer by using a prerequisite package from the set of prerequisite packages, the prerequisite package corresponding to the non-available prerequisite product; and computer usable code for installing the main product on the target computer by using the main package.

9. The computer program product according to claim 8, further including:

computer usable code for each target computer returning feedback information indicative of the result of the installation of each package to the source computer; and computer usable code for the source computer updating configuration information of the target computers according to the feedback information, the determination of the potentially non-available prerequisite products and the determination of said number of target computers being based on the configuration information.

10. The computer program product according to claim 8, wherein the computer usable code for transmitting the distribution structure to the target computers includes, for each target computer:

computer usable code for sending the distribution structure to a depot computer associated with the target computer; and computer usable code for downloading the prerequisite package for each non-available prerequisite product and the main package from the depot computer to the target computer.

11. The computer program product according to claim 10, wherein the main package includes service information indicative of an order of installation of the prerequisite products, the computer usable code for downloading including:
   computer usable code for the depot computer sending the service information to the target computer;
   computer usable code for the target computer requesting the prerequisite package, for each non-available prerequisite product following a first non-available prerequisite product, to the depot computer in response to the successful installation of a previous non-available prerequisite product; and
   computer usable code for the target computer requesting the main package to the depot computer in response to the successful installation of all the non-available prerequisite products.

12. The computer program product according to claim 8, wherein the distribution structure further includes an indication of at least one ex-requisite product being incompatible with the main product, for each target computer the computer program product further including:
   computer usable code for verifying the availability of the at least one ex-requisite product on the target computer; and
   computer usable code for removing each available ex-requisite product from the target computer.

13. The computer program product according to claim 8, wherein the set of potentially non-available prerequisite products includes a prerequisite product such that the prerequisite product is available on one target computer but absent on another target computer, and wherein the distribution structure includes the prerequisite product.

14. The computer program product according to claim 8, wherein the distribution structure is common for all target computers in the plurality of target computers regardless of a configuration of a target computer in the plurality of target computers.

15. A data processing system for distributing software products from a source computer to a plurality of target computers, the data processing system including:
   a source computer;
   a plurality of target computers;
   computer usable code for providing a main package for installing a main product, the main product requiring a set of prerequisite products, and a set of prerequisite packages each one for installing a corresponding prerequisite product;
   computer usable code for selecting at least one of the prerequisite packages, the computer usable code for selecting including computer usable code for determining a set of potentially non-available prerequisite products, a potentially non-available prerequisite product being a prerequisite product not available on at least one of the target computers, and computer usable code for selecting a prerequisite package from the set of prerequisite packages corresponding to each potentially non-available prerequisite product in the set of potentially non-available prerequisite products;
   computer usable code for building a distribution structure for the main package and the at least one prerequisite package;
   computer usable code for determining the number of target computers on which at least one prerequisite product is not available, the distribution structure being built and transmitted only if said number of target computers reaches a threshold value; and
   computer usable code for transmitting the distribution structure from the source computer to the target computers, wherein each target computer includes:
      computer usable code for verifying the availability of the at least one prerequisite product on the target computer;
      computer usable code for installing each non-available prerequisite product on the target computer by using the corresponding prerequisite package; and
      computer usable code for installing the main product on the target computer by using the main package.

16. The data processing system according to claim 15, further including:
   computer usable code for each target computer returning feedback information indicative of the result of the installation of each package to the source computer; and
   computer usable code for the source computer updating configuration information of the target computers according to the feedback information, the determination of the potentially non-available prerequisite products and the determination of said number of target computers being based on the configuration information.

17. The data processing system according to claim 15, wherein the computer usable code for transmitting the distribution structure to the target computers includes, for each target computer:
   computer usable code for sending the distribution structure to a depot computer associated with the target computer; and
   computer usable code for downloading the prerequisite package for each non-available prerequisite product and the main package from the depot computer to the target computer.

* * * * *